Patented Oct. 12, 1937

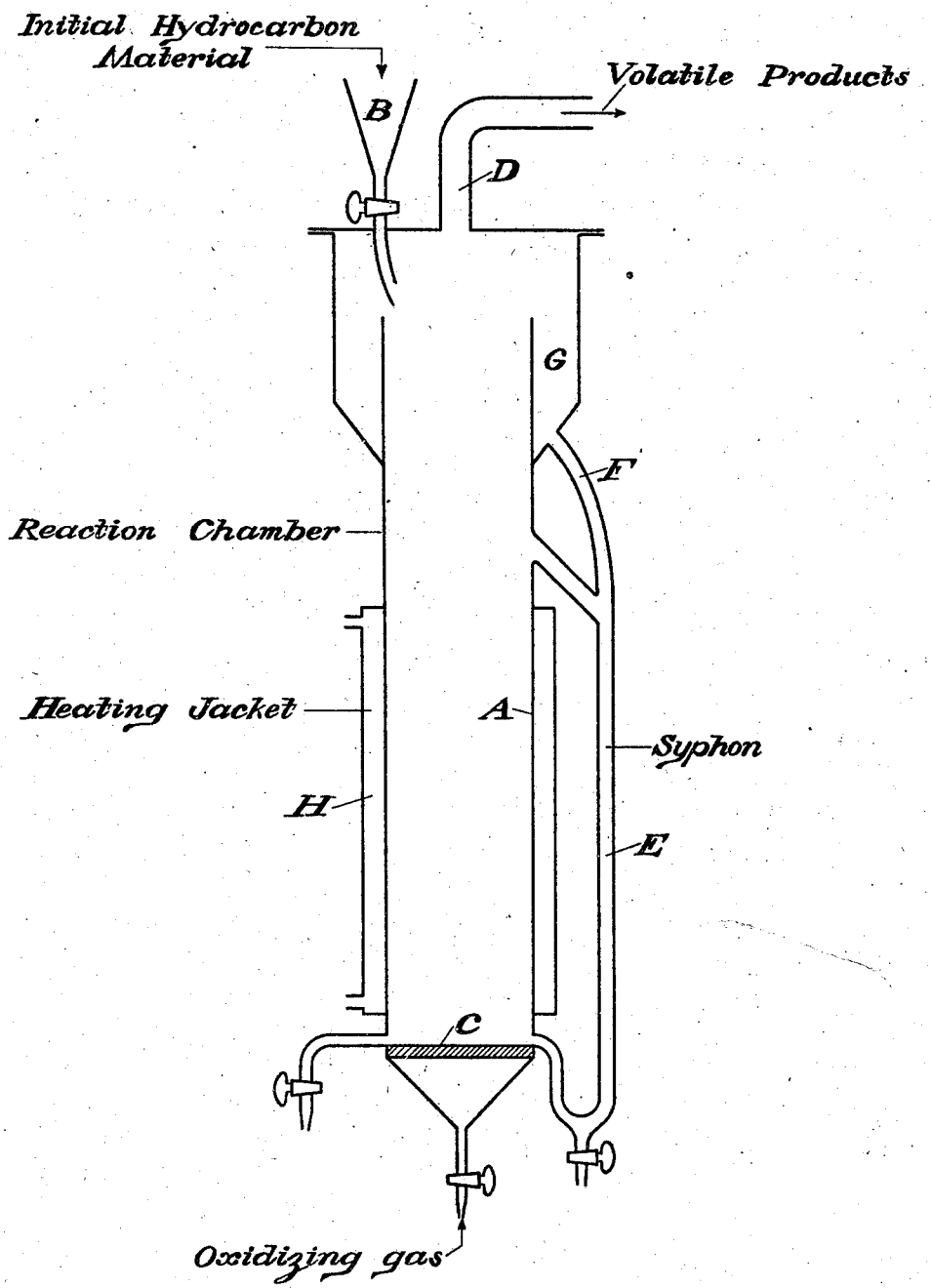

2,095,473

UNITED STATES PATENT OFFICE 2,095,473

PROCESS OF OXIDIZING PARAFFINIC HYDROCARBONS

Emil Keunecke, Oppau, Germany, assignor to I. G. Farbenindustrie Aktiengesellschaft, Frankfort-on-the-Main, Germany Application December 4, 1934, Serial No. 756,004
In Germany December 5, 1933

7 Claims. (Cl. 260—116)

The present invention relates to a process of oxidizing paraffinic hydrocarbons.

I have found that valuable oxidation products consisting substantially of high molecular fatty acids and being free or practically free from matter insoluble in petroleum ether can be obtained in a form most suitable for industrial purposes by subjecting high molecular paraffinic hydrocarbons (such as soft or hard paraffin wax or high boiling fractions of mineral oils) to oxidation by means of gases comprising oxygen at comparatively low temperatures, preferably not surpassing 125° C., in the presence of catalysts comprising chemically combined manganese and alkali metals while introducing the gases comprising oxygen in a fine division. The fine division of the oxidizing gas may be attained by introducing the same through porous ceramic materials such as filtering candles, porous plates or through nozzles or the like. The oxidation may preferably be effected with advantage at as low a temperature as from 90° to 120° C. and at still lower temperature. Even at these low temperatures the oxidation begins rapidly and is finished in a relatively short period of time for example in from 6 to 24 hours if air is employed as oxidizing gas. At about 75° C. most excellent products can be obtained but at this temperature the reaction does not go on so rapidly. If solid initial materials are employed the oxidation is carried out above their melting point.

The catalyst may either consist of a mixture of one or several compounds containing manganese with one or several compounds containing alkali metals or it may consist of one or several compounds containing manganese as well as an alkali metal. Suitable catalysts are for example potassium manganate or mixtures of potassium manganate and sodium carbonate.

It is preferable to employ the catalyst dissolved or dispersed in the material to be oxidized.

A most valuable advantage offered by the process according to the present invention consists in the fact that high molecular fatty acids are obtained in good yields and a very pure form.

In the following the process is described in detail with reference to the accompanying drawing which is a longitudinal section of an apparatus suitable for carrying out the oxidation. A is a cylindrical reaction vessel. B is a hopper through which the material to be oxidized (in which the catalyst is preferably dispersed) can be introduced into A. C is a porous plate of a ceramic material, fritted glass or sintered metal the pores of which plate have a diameter of for example 40$\mu$; the plate C serves for introducing the oxidizing gas. Instead of the said porous plate other porous bodies such as filtering candles or filter cones may be employed. D is a pipe through which the non-consumed portions of the oxidizing gas and eventually volatile oxidation products leave the apparatus. The gaseous or vaporous parts after having passed through D may be led into a stripping or condensing device in order to separate and recover the vaporous or misty products therefrom. (This device is not shown.) Part of the material under treatment circulates through the syphon E whereby regulation of the temperature may be effected by cooling or warming the material flowing through E. (The cooling or heating device is not shown.) In consequence of the fine division of the oxidizing gas and the low temperature the reaction is attended by strong foaming. The foam frothing over from the upper part of the cylinder A flows into the ring-shaped space G where it is converted into liquid. F is a pipe for returning this liquid to E and A. A is provided with a heating jacket H.

The following example will further illustrate the nature of this invention but the invention is not restricted to this example. The parts are by weight.

Example 100 parts of a yellowish-brown crude paraffin wax having a melting point of 50° C. are heated for 2 hours at 150° C. together with 0.18 part of finely powdered potassium permanganate and 0.05 part of caustic potash while stirring intensely. The mass is allowed to cool down to about 100° C. and introduced into the apparatus described above where the material is oxidized for 8 hours by means of air at from 110° to 115° C. The reaction product has a lemon-yellow coloration; it possesses an acid number of 95 and a saponification number of 152.

By working up the said product (removing the unsaponifiable matter after saponification and setting free the acids) a fatty acid of light color is obtained which has the saponification number 220 and which contains only 0.1 per cent of constituents insoluble in petroleum ether. By a distillation in vacuo an acid of pure white coloration is obtained which may be employed for example for the production of soaps.

What I claim is:—

1. The process of producing fatty acids which comprises subjecting a material essentially comprising high molecular paraffinic hydrocarbon material to oxidation by means of a gas comprising oxygen at a temperature not surpassing 120° C. in the presence of a catalyst comprising a compound of manganese and an alkali metal which compound contains manganese in the anion thereof, while introducing the gas comprising oxygen in a fine division.

2. The process of producing fatty acids which comprises subjecting a material essentially comprising high molecular paraffinic hydrocarbon material to oxidation by means of a gas comprising oxygen at a temperature between about 110° and about 115° C. in the presence of a catalyst comprising a compound of manganese and an alkali metal which compound contains manganese in the anion thereof, while introducing the gas comprising oxygen in a fine division.

3. The process of producing fatty acids which comprises subjecting a material essentially comprising high molecular paraffinic hydrocarbon material to oxidation by means of a gas comprising oxygen at a temperature between about 90° and about 120° C. in the presence of a catalyst comprising a compound of manganese and an alkali metal which compound contains manganese in the anion thereof, while introducing the gas comprising oxygen in a fine division.

4. The process of producing fatty acids which comprises subjecting a material essentially comprising high molecular paraffinic hydrocarbon material to oxidation by means of a gas comprising oxygen at a temperature between about 90° and 120° C. in the presence of an alkali metal permanganate, while introducing the gas comprising oxygen in a fine division.

5. The process of producing fatty acids which comprises subjecting a material essentially comprising high molecular paraffinic hydrocarbon material to oxidation by means of a gas comprising oxygen at a temperature not surpassing 120° C. in the presence of a catalyst comprising an alkali metal manganese compound, selected from the class consisting of manganites, manganates and permanganates, while introducing the gas comprising oxygen in a fine division.

6. The process of producing fatty acids which comprises subjecting a material essentially comprising high molecular paraffinic hydrocarbon material to oxidation by means of a gas comprising oxygen at a temperature not surpassing 120° C. in the presence of potassium permanganate, while introducing a gas comprising oxygen in a fine division.

7. The process of producing fatty acids which comprises treating a material essentially comprising high molecular paraffinic hydrocarbon material in the presence of a catalyst comprising a compound containing manganese in the anion thereof at a temperature above 120° C., then cooling down the mixture to a temperature below 120 C., and introducing a gas comprising oxygen in fine division.

EMIL KEUNECKE.